(12) United States Patent
Ooki

(10) Patent No.: US 6,738,464 B1
(45) Date of Patent: May 18, 2004

(54) PERSONAL DATA SHARING SYSTEM IN TELEPHONE NETWORK

(75) Inventor: Yasuomi Ooki, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 660 days.

(21) Appl. No.: 09/670,319

(22) Filed: Sep. 26, 2000

(30) Foreign Application Priority Data

Sep. 27, 1999 (JP) .......................... 11/271958

(51) Int. Cl.$^7$ .............................. H04M 3/42
(52) U.S. Cl. ................... 379/201.02; 379/201.01; 379/207.16; 379/88.13; 379/88.16
(58) Field of Search ................ 379/110.01, 157, 379/90.01, 93.24, 93.01, 272, 286, 100.16, 373.01; 455/435, 456.2, 560; 395/603

(56) References Cited

U.S. PATENT DOCUMENTS 5,245,653 A * 9/1993 Izumi .......................... 379/157
6,047,047 A * 4/2000 Aldridge et al. .......... 379/93.24
6,128,372 A * 10/2000 Tsai et al. ................. 379/90.01

FOREIGN PATENT DOCUMENTS

| JP | 08-139798 | 5/1996 | .......... H04M/1/274 |
| JP | 11-234388 | 8/1999 | .......... H04M/1/274 |

* cited by examiner

Primary Examiner—Ahmad F. Matar
Assistant Examiner—Marie C. Ubiles
(74) Attorney, Agent, or Firm—Whitham, Curtis & Christofferson P.C.

(57) ABSTRACT

This invention is comprised of a telephone exchange having a memory for storing a telephone number and a personal data corresponding to the telephone number; a telephone set stored in the telephone exchange; and a portable information terminal having a memory for storing the telephone number and personal data corresponding to the telephone number, wherein when the portable information terminal is installed in the telephone set, the content in the memory in the telephone exchange is collated with the content in the memory in the portable information terminal and the contents in both memories are coincided to each other.

21 Claims, 8 Drawing Sheets

FIG.4

104:MEMORY IN THE TELEPHONE EXCHANGE

| TELEPHONE NUMBER | PERSONAL DATA | |
|---|---|---|
| 407 — 1111 | | 401 |
| 408 — 2222 | | 402 |
| 409 — 3333 | | 403 |
| 410 — 4444 | | 404 |
| 411 — 5555 | | 405 |
| 412 — NONE | NONE | 406 |

FIG.5

203: MEMORY IN THE TELEPHONE SET

| | TELEPHONE NUMBER | PERSONAL DATA | |
|---|---|---|---|
| 507 | NONE | NONE | 501 |
| 508 | NONE | NONE | 502 |
| 509 | NONE | NONE | 503 |
| 510 | NONE | NONE | 504 |
| 511 | NONE | NONE | 505 |
| 512 | NONE | NONE | 506 |

FIG.6

303: MEMORY IN THE PDA

| | TELEPHONE NUMBER | PERSONAL DATA | |
|---|---|---|---|
| 607 | 1111 | | 601 |
| 608 | 2222 | | 602 |
| 609 | 3333 | | 603 |
| 610 | 5555 | | 604 |
| 611 | 7777 | | 605 |
| 612 | NONE | NONE | 606 |

_US 6,738,464 B1_

PERSONAL DATA SHARING SYSTEM IN TELEPHONE NETWORK

BACKGROUND OF THE INVENTION

1. Field of the Invention

This invention relates to a personal data sharing system in a telephone network, and more particularly a system for sharing personal data such as a telephone number, a personal name, a company name, a section at a company and an address or the like among a telephone exchange, a telephone set, a portable information terminal (a beeper, PHS—Personal Handyphone System) and PDA (Personal Digital Assistants) and the like.

2. Description of the Related Art

In recent years, there have been fairly wide spread a telephone exchange and a telephone set in which some personal data such as a telephone number, a personal name, a company name, a section name in a company and an address or the like are stored in a memory, a call-up operation and a call-receiving operation are simplified and assured under utilization of these stored data. Up to now, these personal data have been separately registered in the memory installed in a beeper, PHS, a home-use telephone set and an office-use telephone exchange, for example. Accordingly, there occurs one case that the personal data registered in the office-use telephone exchange are not registered in PHS or the other case that the personal data registered in PHS are not registered in the office-use telephone exchange. In turn, there is provided a system in which some personal data are revised automatically among a plurality of telephone sets. For example, the gazette of Japanese Patent Laid-Open No. Hei 6-121017 discloses a technology in which a call-up device having extension line telephone book data stored therein is connected to the extension line telephone set and then the extension line telephone set may transmit a call in reference to the extension line telephone book data.

However, this prior art is a technology in which some personal data are shared and revised between the extension line telephone sets stored in the same telephone exchange network. Accordingly, in order to utilize the customer's personal information registered in the portable information terminal in the extension line telephone network at a going-out location, some personal information data must be manually registered in the extension line telephone set. That is, some personal information data must be displayed at the display section of the portable information terminal and the displayed some personal information data must be registered in the extension line telephone set while the displayed some personal information data are being confirmed by eyes.

SUMMARY OF THE INVENTION

Object of the Invention

It is an object of the present invention to enable some personal data collected at the portable information terminal such as a PDA or the like to be utilized at the extension line telephone set stored in the same telephone exchange.

SUMMARY OF THE INVENTION

The present invention is comprised of a telephone exchange having a memory for storing some personal data such as a telephone number collected through a portable information terminal and some personal data corresponding to the collected telephone number, a telephone set stored in the telephone exchange, and the portable information terminal having a memory for storing the telephone numbers and some personal data corresponding to the telephone numbers, and when the portable information terminal is installed in the telephone set, the content of the memory in the telephone exchange is collated against the content of the memory in the portable information terminal so as to cause the contents in both memories to be coincided to each other.

BRIEF DESCRIPTION OF THE DRAWINGS

FIG. 4 is a view for showing a data structure within the memory in the telephone exchange.

FIG. 5 is a view for showing a data structure in the memory in the telephone set.

FIG. 6 is a view for showing a data structure in the memory in PDA.

DETAILED DESCRIPTION OF THE PREFERRED EMBODIMENTS

Figure 1:
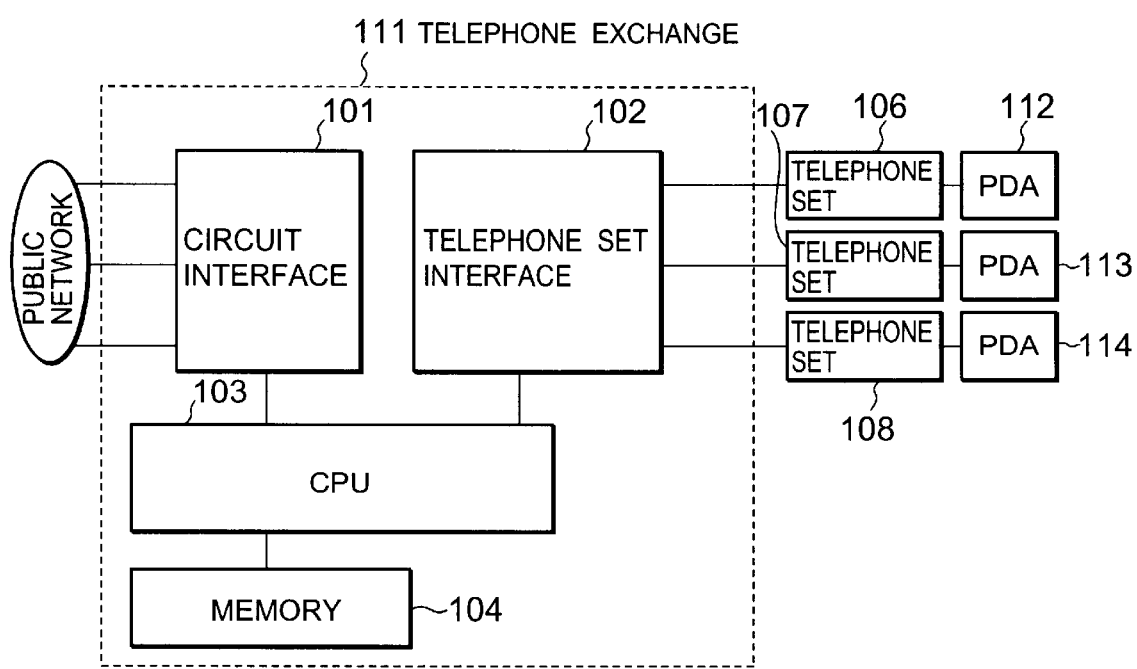
FIG. 1 is a block diagram for showing an entire configuration of the present invention.

Referring now to the drawings, a preferred embodiment of the present invention will be described as follows.

Figure 2:
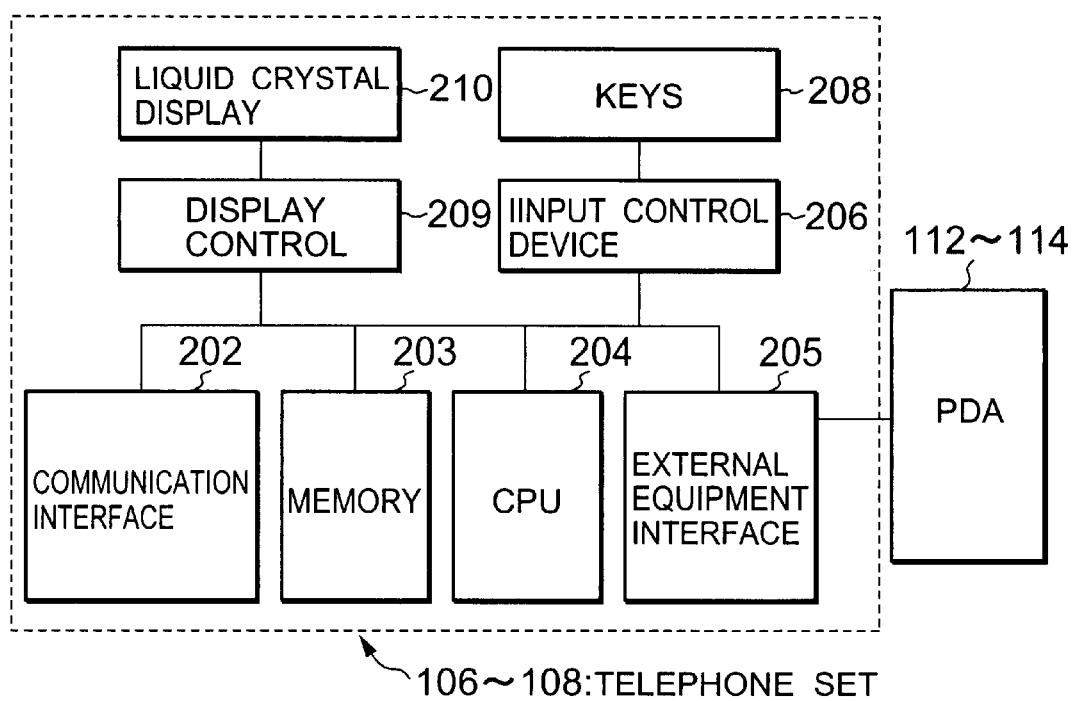
FIG. 2 is a block diagram for showing a configuration of a telephone set.

FIG. 1 is a block diagram for showing an example of configuration of a telephone network. In this Figure, reference numeral 111 denotes a telephone exchange connected to a public telephone network; 106, 107, 108 telephone sets which can be connected with PDAs 112 to 114; 101 a circuit interface connected to a public telephone network; 102 a telephone set interface connected to a telephone set; 103 CPU; and 104 a memory for use in storing some personal data such as a telephone number and an address or the like. FIG. 2 is a block diagram for showing an example of inner configuration of each of the telephone sets 106 to 108 shown in FIG. 1. In FIG. 2, reference numeral 202 denotes a communication interface for performing a communication with the telephone circuit interface 102 of the telephone exchange 111 shown in FIG. 1; 203 a memory for storing some personal data such as a telephone number and an address or the like; 204 CPU for controlling a data transfer within the telephone set; 205 an external equipment interface for performing a communication with PDAs 112 to 114; 206 an input control device for performing a controlling operation for keys 208; 209 a display control for displaying characters and images to a liquid crystal display 210; and 210 the liquid crystal display in which characters and images or the like are displayed.

Figure 3:
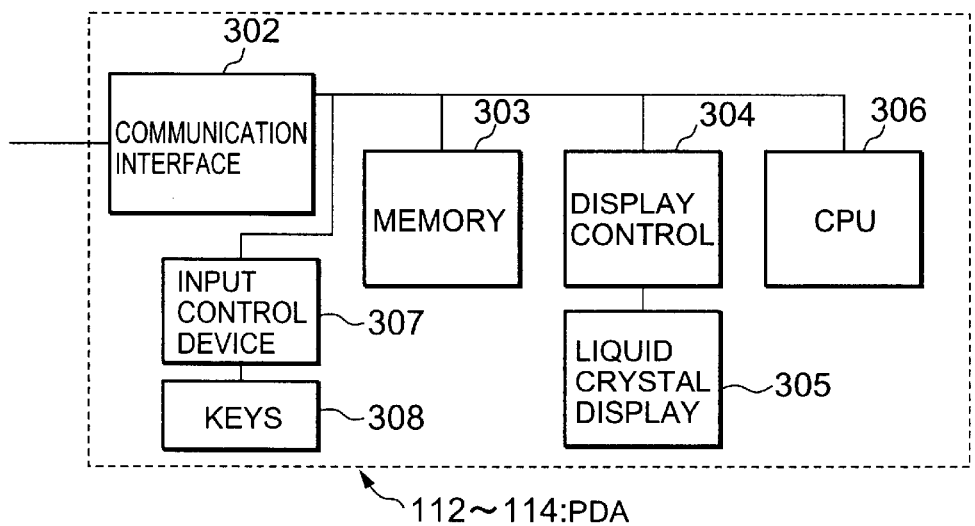
FIG. 3 is a block diagram for showing a configuration of PDA.

FIG. 3 is a block diagram for showing an example of an inner configuration of each of PDAs 112 to 114; 302 a communication interface for performing communications with the telephone set; 303 a memory for storing some personal data such as telephone numbers, addresses or the like; 304 a display control for displaying characters and images or the like to the liquid crystal display 305; 305 the liquid crystal display in which characters and images or the like are displayed; 306 a CPU for executing a control program; and 307 an input control device for controlling keys 308. FIG. 4 is a view for showing a data structure within the memory 104 of the telephone exchange 111, FIG. 5 is a view for showing a data structure in the memory 203 of the telephone set, and FIG. 6 is a view for showing a data structure in the memory 303 of PDA. All these memories store a correspondence table for indicating a relation between the telephone numbers and some personal data. Next, a manner for referring these Figures will be described in detail. For example, a cell 407 in FIG. 4 stores 1111 as a telephone number, and a cell 401 in FIG. 4 stores some personal data (such as a company name, a division name and a personal name or the like) corresponding to this telephone number. A cell 412 stores no items at all. That is, the cell 412 is a vacant space. In addition, as shown in FIG. 2, the entire memory 203 in the telephone set stores nothing. Further, as shown in FIG. 6, the content in the memory 303 of PDA is partially different from the content in the memory 104 of the telephone exchange 111. That is, although the memory 104 in the telephone exchange stores a telephone number 4444 as well as its corresponding personal data, the memory 303 in PDA does not store these data. To the contrary, the memory 303 in PDA stores a telephone number 7777 as well as its corresponding personal data, the memory 104 in the telephone exchange does not store these data.

Figure 7:
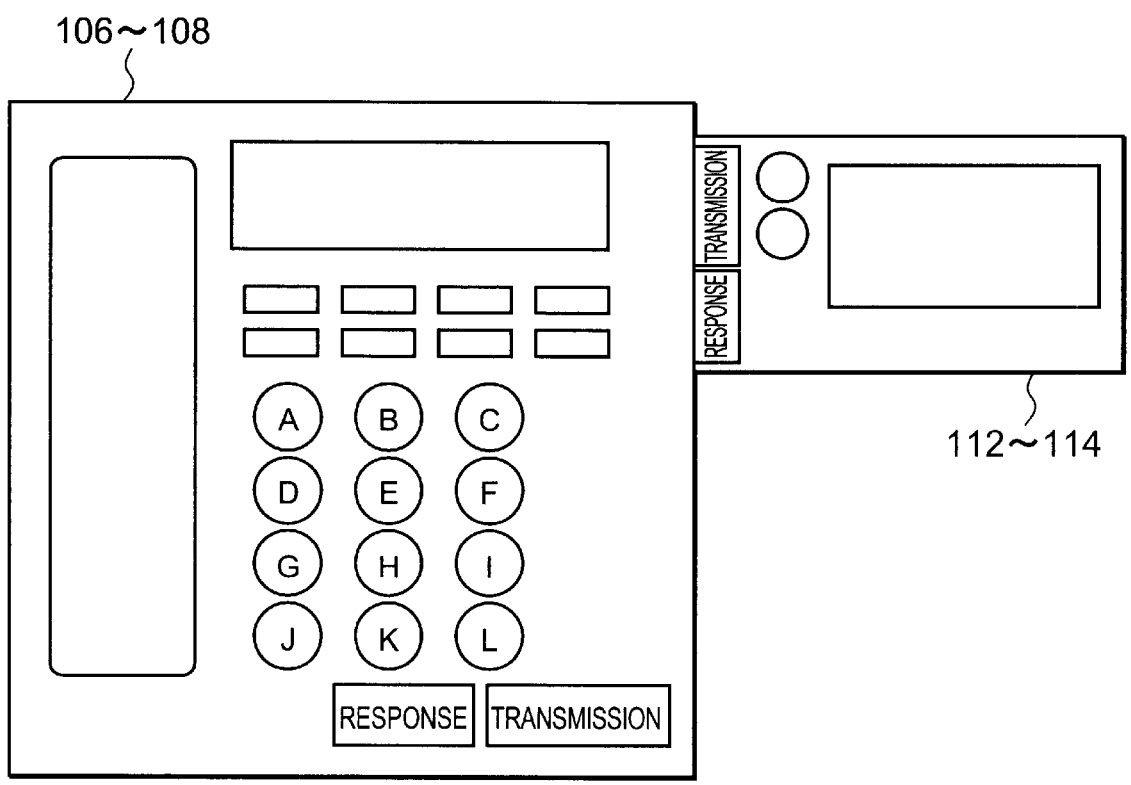
FIG. 7 is a view for showing a state in which PDA is installed in a telephone set.
Figure 8:
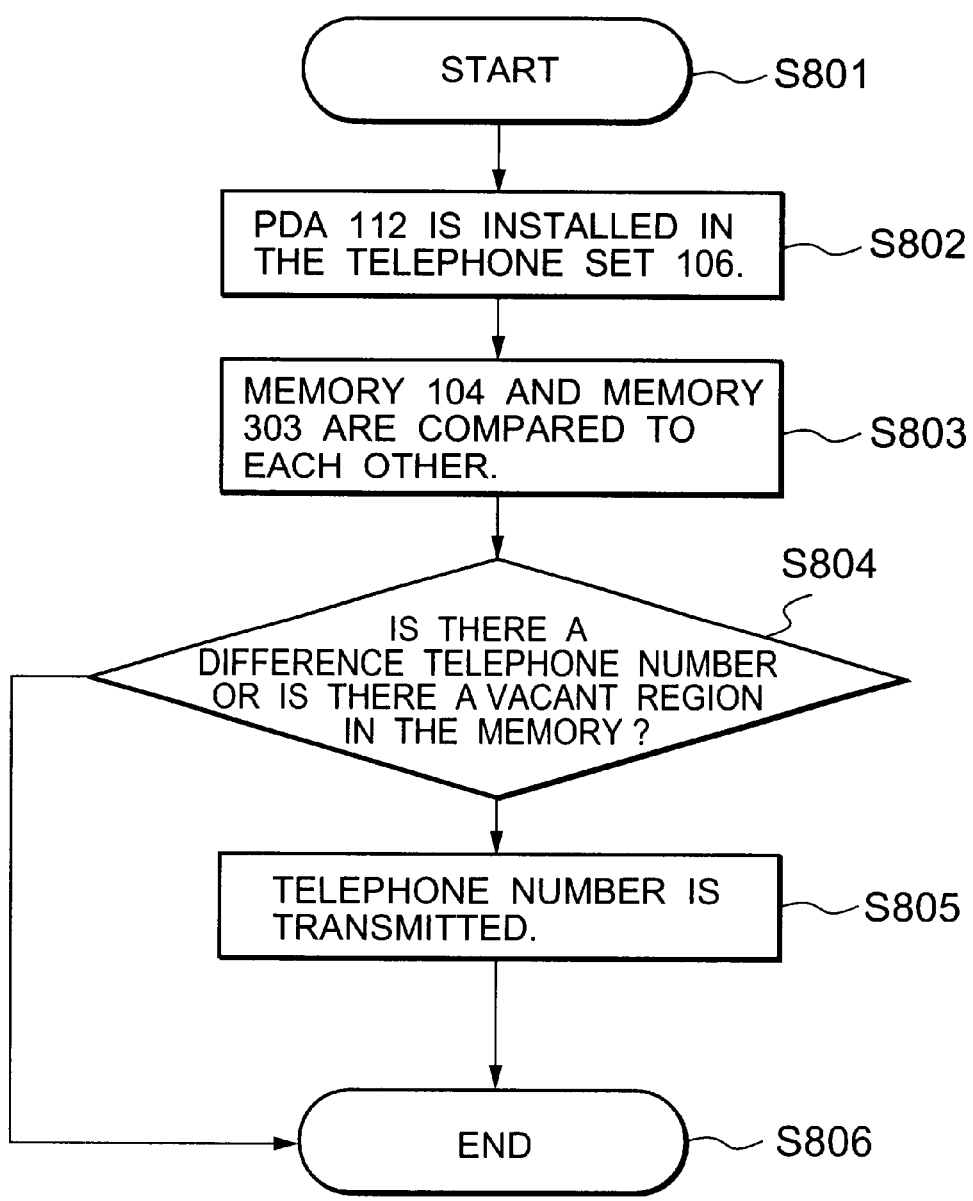
FIG. 8 is a flow chart for illustrating an operation of the present invention.

In turn, the main body of a telephone set and PDA in the present invention have structures that can be easily attached to or removed from each other. FIG. 7 shows a state in which PDA is installed in the telephone set. Referring now to the block diagrams of FIGS. 1, 2, 3, 4 and 6 and the flow chart of FIG. 8, an operation in the case that PDAs 112 to 114 are installed in the telephone sets 106 to 108 will be described as follows.

When PDA 112 is installed in the telephone set 106 (a step 802), the external equipment interface 205 of the telephone set 106 detects this installation and transmits a signal informing the installation of PDA 112 to CPU 204. CPU 204 sends out the signal to the telephone exchange 111 through the communication interface 202. CPU 103 in the telephone exchange 111 receives the signal through the telephone set interface 102. CPU 103 reads out the stored content in the memory shown in FIG. 4 from the memory 104 through the telephone set interface 102 when the signal is received, and then sends out the signal to the telephone set 106. Then, the telephone set 106 sends the received memory content to PDA 112 through the external equipment interface. Then, CPU 306 of PDA compares the stored content in the memory with the content stored in the memory 303 (a step 803). Comparing FIG. 4 with FIG. 6 shows that the telephone number (4444) at the cell 410 is not present in the memory 303 in PDA and in turn the telephone number (7777) in the cell 611 is not present in the memory 104 in the telephone exchange. In view of this fact, it is necessary to store both the telephone number (4444) and some personal information corresponding to this telephone number in the memory of PDA and further to store both the telephone number (7777) and some personal information corresponding to the telephone number in the memory of the telephone exchange.

Then, it is checked whether or not there are vacant memory regions in both memory 303 and memory 104 (a step 804). If there are vacant regions, PDA 112 transmits information such as the telephone number (7777) toward the telephone exchange 111 and in turn the telephone exchange 111 transmits information such as the telephone number (4444) toward PDA 112 (a step 805). After this operation, PDA 112 stores information such as the telephone number (4444) in the vacant region 612 in the memory 303, and the telephone exchange 111 stores information such as the telephone number (7777) in the vacant region 412 in the memory 104.

As a result of these series of operations, the personal data registered in the memory 104 in the telephone exchange 111 are coincided with the personal data registered in the memory 303 in PDA 112. That is, the telephone numbers (1111) to (7777) as well as the personal information corresponding to the telephone numbers are stored in both memories 104 and 303.

As described above, when PDAs 112 to 114 are installed in the telephone sets 106 to 108, a common setting of personal data is carried out automatically between the telephone exchange 111 and PDAs 112 to 114. With such an arrangement as above, it becomes possible to utilize the personal data collected by PDAs 112 to 114 also at the extension line telephone set.

In the aforesaid description, although the common setting of the personal data is carried out automatically in concurrent with the installation of PDA, it may also be applicable that the common setting is carried out through a manual operation of a user such as a button-based operation and the like. In addition, in order to protect a privacy of a person, it may also be applicable that only the personal data of some people are set in common.

Next, referring to FIGS. 2 and 3, there will be described a case in which the stored content in the memory of the telephone set and the stored content in the memory of PDA are set in common.

The telephone set 106 is provided with a memory 203 for use in storing a telephone number as well as some personal data corresponding to the telephone number. The telephone set 106 sends the content stored in the memory shown in FIG. 5 to PDA 112 in the case that PDA 112 is installed at the telephone set 106. In turn, PDA 112 is provided with a memory 303 for use in storing the telephone number and some personal data corresponding to the telephone number. The memory structure within the memory is the same as that shown in FIG. 6. PDA 112 collates the stored content in the memory with the content in the memory of its own after the stored content in the memory is sent from the telephone set 106. As apparent from FIG. 5, the content in the memory 203 of the telephone set is vacant. Thus, PDA 112 may send out all the contents in the memory 303 to the telephone set 106. The telephone set 106 receiving the content stores it in the memory 203. With such an arrangement as above, the content in the memory 203 becomes the same as that stored in the memory 303.

Then, referring again to FIG. 1, there will be described a method for revising the memory in PDA in reference to the receiving of call signal as follows.

It is assumed that the call receiving signal added with the transmitter's number (for example, 4444) is inputted to the telephone exchange 111. CPU 103 in the telephone exchange 111 sends the transmitter's number to PDA through the telephone set interface 102. Upon receiving the transmitter's number, CPU 306 of PDA refers to the memory 303 within PDA and judges if the telephone number of 4444 is present. As apparent from FIG. 6, since there is no telephone number of 4444 in the memory 303, CPU 306 in PDA informs a non-presence of the corresponding number to CPU 103 in the telephone exchange 111. CPU 103 receiving the notice refers to the memory 104 in the telephone exchange 111 and acknowledges if the telephone number 4444 is present. Since the telephone number 4444 is present within the memory 104, CPU 103 sends out the corresponding number as well as some personal information corresponding to the former telephone number to PDA. CPU 306 in PDA stores these information in a vacant region 612 in the memory 303. With the aforesaid operation, a new telephone number and its corresponding personal information are registered in PDA. In the case that the corresponding telephone number or the like is registered in the memory in the telephone set, PDA is allowed to receive the corresponding number from the telephone set.

In the aforesaid description, although PDA has been applied as an example of the portable information terminal, it is of course apparent that a beeper and PHS can also be applied in place of PDA.

What is claimed is:

1. A personal data sharing system comprised of a telephone exchange having a memory for storing personal data, a telephone set connected to said telephone exchange and a portable information terminal having a memory for storing personal data, wherein in the case that said portable information terminal is installed in said telephone set, the stored content in the memory of said telephone exchange and the content stored in the memory of said portable information terminal is compared such that, the content in the memory in said telephone exchange is collated with the content in the memory in said portable information terminal to cause the contents in both memories to be coincided to each other.

2. A personal data sharing system in a telephone network comprised of:

a telephone set capable of installing a portable information terminal and sending an installing signal to a telephone exchange when said portable information terminal is installed in its own telephone set;

a telephone exchange comprised of a memory for storing personal data and means for sending the content in said memory to said portable information terminal when said installing signal is received; and a portable information terminal comprised of a memory for storing personal data, means for comparing the stored content in the memory of said telephone exchange with the content stored in the memory of said portable information terminal, and means for collating the content in the memory transmitted from said telephone exchange with the content in the memory in said portable information terminal and means for informing a presence of non-coincidence to said telephone exchange when both contents are not coincided to each other as a result of collating operation, said telephone exchange and said portable information terminal cause the content in the memory in said telephone exchange to be coincided with the content in the memory in said portable information terminal when said non-coincidence is present.

3. A telephone communication system sharing personal data in a telephone network comprised of:

a telephone set having a memory for storing personal data, and a portable information terminal having a memory for storing personal, wherein the stored content in the memory of a telephone exchange and the content stored in the memory of said portable information terminal is compared such that the content in the memory in said telephone set is collated with the content in the memory in said portable information terminal when said portable information terminal is installed in said telephone set to cause the contents in both memories to be coincided to each other.

4. A personal data sharing system in a telephone network comprised of:

a telephone set provided with a memory for storing personal data and means for sending out the content of said memory to a portable information terminal when the portable information terminal is installed in its own telephone set;

a portable information terminal comprised of a memory for storing personal data, means for comparing the stored content in the memory of said telephone set with the content stored in the memory of said portable information terminal, and means for collating the content in the memory transmitted from said telephone set with the content in the memory of said telephone set and means for informing a presence of non-coincidence to said telephone set when both contents are not coincided to each other as a result of collating operation, said telephone set and said portable information terminal cause the content in the memory in said telephone set to be coincide with the content in the memory in said portable information terminal when said non-coincidence is present.

5. A personal data sharing system according to claim 1, wherein said portable information terminal is a beeper, PDA (Personal Digital Assistant) or PHS (Personal Handyphone System).

6. A personal data sharing system according to claim 1, wherein specified personal data are not coincided to each other.

7. A personal data sharing system according to claim 1, wherein said portable information terminal is installed in said telephone set and a specified button provided in said portable information terminal or said telephone set is depressed to cause the contents of both memories to be coincided to each other.

8. A personal data sharing system according to claim 1, wherein when there is a received signal added with a transmitter's number, said transmitter's number is not present in the memory in said portable information terminal, but present in the memory in said telephone exchange or in said telephone set, the personal data including a telephone number, is transferred from the memory in said telephone exchange or said telephone set to the memory in said portable information terminal.

9. A personal data sharing system according to claim 2, wherein said portable information terminal is a beeper, PDA (Personal Digital Assistant) or PHS (Personal Handyphone System).

10. A personal data sharing system according to claim 3, wherein said portable information terminal is a beeper, PDA (Personal Digital Assistant) or PHS (Personal Handyphone System).

11. A personal data sharing system according to claim 4, wherein said portable information terminal is a beeper, PDA (Personal Digital Assistant) or PHS (Personal Handyphone System).

12. A personal data sharing system according to claim 2, wherein specified personal data are not coincided with each other.

13. A personal data sharing system according to claim 3, wherein specified personal data are not coincided with each other.

14. A personal data sharing system according to claim 4, wherein specified data are not coincident with each other.

15. A personal data sharing system according to claim 2, wherein said portable information terminal is installed in said telephone set and a specified button provided in said portable information terminal or said telephone set is depressed to cause the contents of both memories to be coincided to each other.

16. A personal data sharing stem system according to claim 3, wherein said portable information terminal is installed in said telephone set and a specified button provided in said portable information terminal or said telephone set is depressed to cause the contents of both memories to be coincided to each other.

17. A personal data sharing system according to claim 4, wherein said portable information terminal is installed in said telephone set and a specified button provided in said portable information terminal or said telephone set is depressed to cause the contents of both memories to be coincided to each other.

18. A personal data sharing system according to claim 1 wherein said personal data can be a telephone number, a personal name, a company name, a section at a company or an address.

19. A personal data sharing system according to claim 2 wherein said personal data can be a telephone number, a personal name, a company name, a section at a company or an address.

20. A personal data sharing system according to claim 3 wherein said personal data can be a telephone number, a personal name, a company name, a section at a company or an address.

21. A personal data sharing system according to claim 4 wherein said personal data can be a telephone number, a personal name, a company name, a section at a company or an address.

* * * * *